Figure 1:
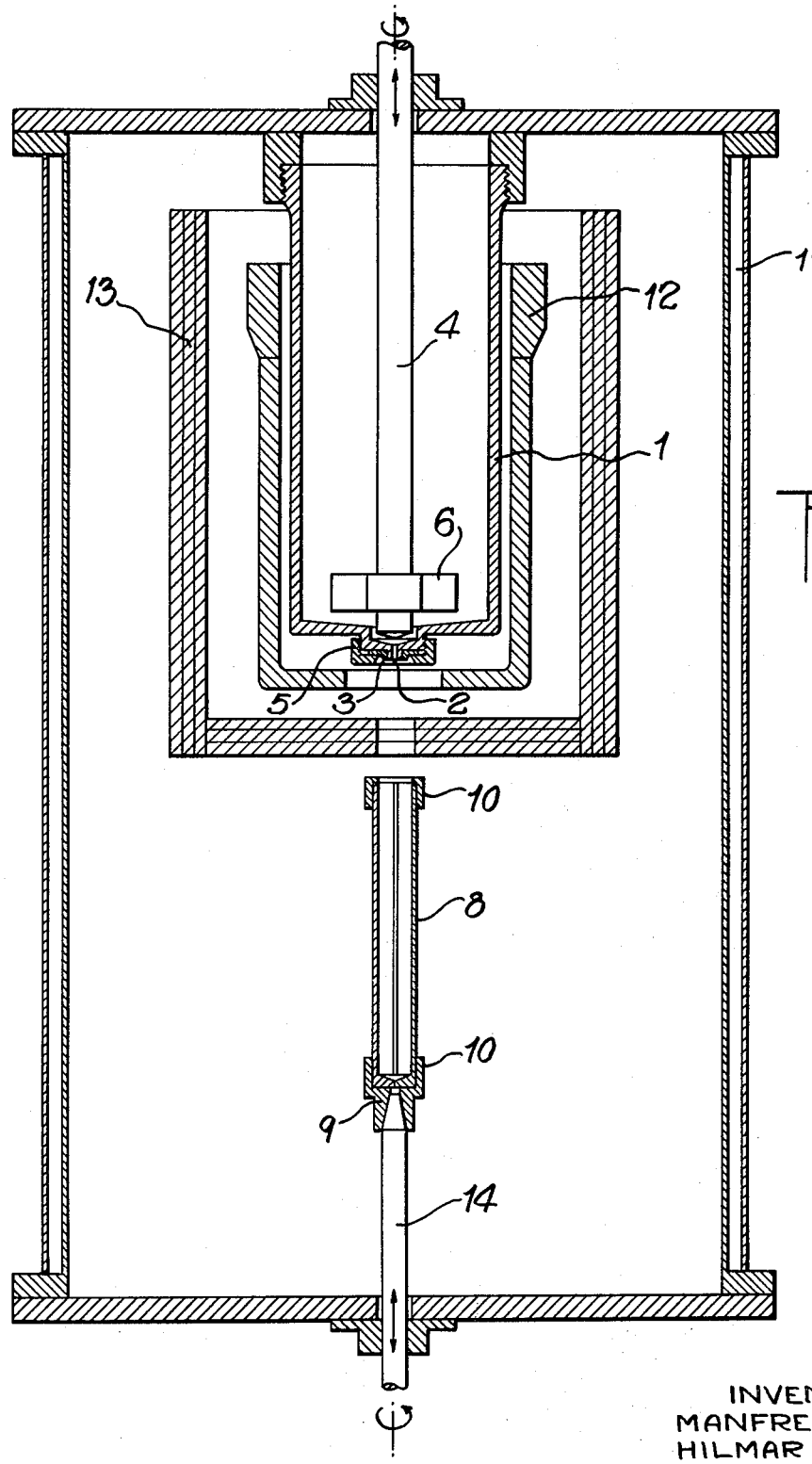

United States Patent
Vogerl et al.

[15] 3,675,709
[45] July 11, 1972

[54] APPARATUS FOR MANUFACTURING SEMICONDUCTOR SUBSTANCES FROM GERMANIUM-SILICON OR MOLYBDENUM-SILICON

[72] Inventors: Manfred Vogerl; Hilmar Daxer, both of Munich, Bavaria; Manfred Roder, Neukatzwang/B., Nurnberg, Bavaria; Wolfgang Dietz, Munich, Bavaria, all of Germany

[73] Assignee: Consortium Fur Elektrochemische Industrie G.m.b.H., Bavaria, Germany

[22] Filed: Aug. 14, 1969

[21] Appl. No.: 850,010

[30] Foreign Application Priority Data

Aug. 16, 1968 Germany ........................ P 17 69 979.5

[52] U.S. Cl. .............................................. 164/335, 164/136
[51] Int. Cl. ...................................... B22d 25/00, B22d 39/00
[58] Field of Search ...................... 164/133, 136, 335, 337; 23/209.4, 209.5, 292; 13/31; 266/39; 18/2.7; 264/13

[56] References Cited

UNITED STATES PATENTS

| 3,367,394 | 2/1968 | Roder et al. ........................ 164/136 X |
| 3,490,516 | 1/1970 | Basche et al. .......................... 164/273 |

*Primary Examiner*—Robert D. Baldwin
*Attorney*—Donald Malcolm

[57] ABSTRACT

A method and apparatus for manufacturing semiconductor bodies from germanium-silicon or molybdenum-silicon in which a homogeneous melt of the substance under treatment is made in a melting vessel which has a capillary opening in the bottom. A vertically movable receiver, such as a crucible, is mounted beneath the capillary opening, and a piston is movable up and down in the melting vessel above said capillary opening to press drops of the molten substance in said vessel out through said opening and into the receiver where said substance is solidified in crystalline form. The method and apparatus insure that the dropping sequence of said drops causes each consecutive drop to enter the receiver before the preceding drop has fully solidified.

4 Claims, 3 Drawing Figures

3,675,709

APPARATUS FOR MANUFACTURING SEMICONDUCTOR SUBSTANCES FROM GERMANIUM-SILICON OR MOLYBDENUM-SILICON

It is known that homogeneous bodies of germanium-silicon alloys can be manufactured by removing melts of germanium and silicon drop by drop from a melting vessel and crystallizing them in a molding vessel located underneath. The removal of the melts is done by means of a piston or plunger which extrudes the melts through a capillary opening on the bottom of the melting vessel (DAS No. 1,230,227).

However, the properties of the quartz glass crucibles employed heretofore, particularly in manufacturing semi-conductor bodies having melting temperatures even higher than molybdenum-silicon, for instance, have proved to be unsatisfactory. Other crucible materials like beryllium oxide, silicon nitride or boron nitride cannot be used either because of the danger of contamination or because of their inferior mechanical stability.

On the other hand, melting vessels made of pyrolytic graphite, electrographite or silicon carbide are sufficiently stable and resistant against germanium-silicon and molybdenum-silicon melts, but, then, when such crucibles are employed in the manufacture of homogeneous semiconductor substances, in accordance with the method of DAS No. 1,230,227, what is obtained are only non-homogeneous semiconductor substances riddled with cracks and cavities, because the sequence and size of the drops have never been uniform.

We have now discovered a novel apparatus for manufacturing semiconductor bodies from germanium-silicon or molybdenum-silicon, in such a way that the product obtained is flawless. Our method is characterized by the following features:

a. a homogeneous melt, which is located in a melting vessel made of pyrolytic graphite, electrographite or silicon carbide, is extruded in drops through a capillary opening on the bottom of the melting vessel by means of a piston, the lower end of the capillary opening being surrounded by boron nitride or silicon nitride;

b. drops having an ever constant weight ranging from 5 to 200 mg. are removed from the melting vessel by regulating the lifting and dropping level and/or the smallest distance of the piston from the capillary opening in the melting vessel and/or changing the size of the capillary opening; and c. at the crystallization front the melt is made to set in thin layers and the drop sequence is so arranged that each consecutive drop enters before the preceding drop has fully set.

Having a piston with an up-and-down motion that can be adjusted to the minimum distance from the capillary opening, it is possible to regulate the drop sizes and the time sequence of the drop to a degree of precision never before achieved. The surprising result of this method and apparatus is that when the lower end of the capillary opening is surrounded by boron nitride or silicon nitride, a regular uniform drip off the melt is obtained. The uniform drops originating in this fashion fall vertically into the collecting crucible where they solidify into homogeneous semiconductor bodies.

As exemplified by the apparatus hereinafter described, the drop sizes are regulated by setting the distance of the piston from the capillary opening during the lifting and dropping motion, and by adjusting the exit of the capillary opening. The piston never touches the capillary opening, however. The minimum distance of the piston from the capillary opening is preferably to be from 0.1 to 10 mm. A piston formed as hereinafter described extrudes a fixed melt quantity through the opening, depending on the sinking depth. The drop size will depend here on the displaced volume. When the weight of the drop ranges from 5 to 200 mg., preferably though from 10 to 60 mg., semiconductor bodies of good quality are obtained.

The time interval of drops can be regulated by the lifting frequency of the piston. In order to obtain the best results, however, the lifting frequency must be so adjusted that the consecutive drop appears before the preceding drop has fully solidified on the crystallization front.

As the next step the support for the stalagmitically growing semiconductor body, or for the collecting crucible, is lowered at the same rate as the crystallization front progresses in order to make sure that the drops appear and set on the crystallization front constantly under unvarying conditions. When rectangular semiconductor bodies with large cross-section areas are to be manufactured it is of particular importance that the collecting crucible be intensively rotated.

Semiconductor bodies manufactured in accordance with the method of our invention can also be mixed with the usual doping agents like boron, aluminum, gallium, phosphorus, arsenic or antimony.

Figure 2:
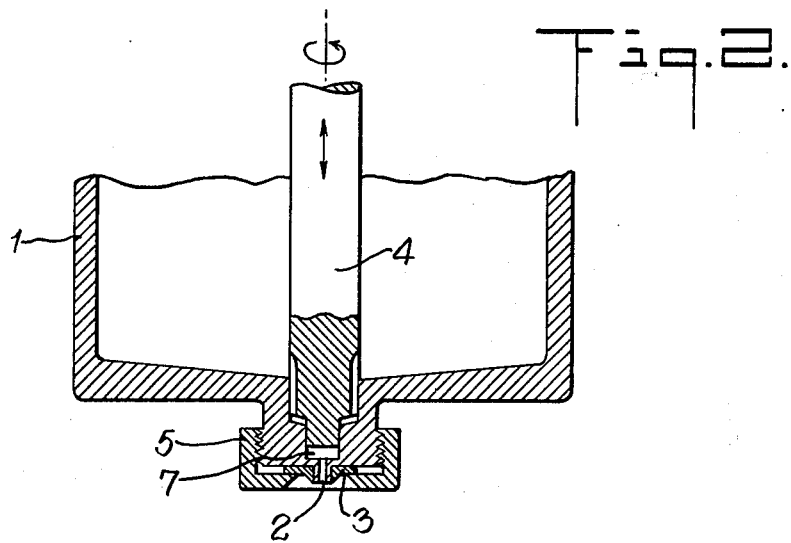
Figure 3:
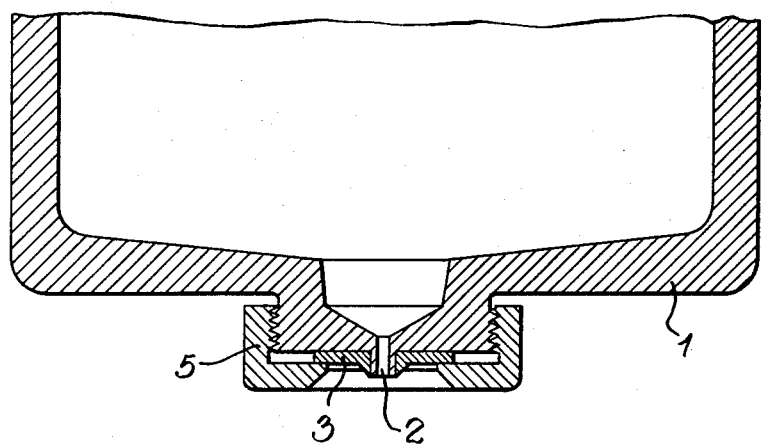

The invention is described in connection with the accompanying drawing, in which:

FIG. 1 is a diagrammatic sectional view of an apparatus for carrying out the method of the invention;

FIG. 2 is an enlarged vertical section through the lower end of the melting vessel, the piston, and a modified capillary opening; and FIG. 3 is an enlarged vertical section through the lower end of the melting vessel of FIG. 1, showing in detail the manner in which the boron nitride or silicon nitride ring or collar is secured about the lower end of the capillary opening at the bottom of the melting vessel.

A device for performing the method of the invention is illustrated in FIG. 1. This apparatus has a melting vessel 1, made of pyrolytic graphite, electrographite or silicon carbide, having an outlet portion defining a capillary opening 2 on the bottom of melting vessel 1, and a ring or collar 3 (FIG. 1) affixed on the outside of the melting vessel and surrounding the lower end of the outlet portion made either of boron nitride or silicon nitride, with an inside diameter of the same size as the outside diameter of the outlet portion defining opening 2, of an up-and-down movable piston or plunger 4 and a support or holder 9 (FIG. 1) for receiving the forming semiconductor body, or a collecting crucible 8.

However, melting vessels have only a surface coating made of pyrolytic graphite or silicon carbide can also be used.

FIG. 3 is a vertical section of the lower part of vessel 1 giving a clearer view of the set-up by which nut 5 holds in place the ring or collar 3 of boron nitride or silicon nitride around the lower end of the outlet portion defining capillary opening 2.

The capillary opening 2 in the bottom of the melting vessel has an inside diameter of about 1 to 3 mm. The collar 3 surrounding it is preferably made of boron nitride. It can be replaced and, as shown in FIG. 3, screwed in or out by means of nut 5. The piston 4 (FIGS. 1 and 2) can also be made of pyrolytic graphite, electrographite or silicon carbide. It can be made to act as a stirrer with the attachment 6 (FIG. 1) within the area it submerges into the melt, and thus give the melt a stirring motion.

FIG. 2 presents a special modification of the device shown in FIG. 1. The lower end of the piston 4 is here fitted precisely in (it makes a close running fit with) an enlarged opening 7 over the capillary opening 2, whereby the effect of a measuring or dosage device for the melt is achieved through the raising and lowering of piston 4, or, in other words, a determined volume of melt is each time extruded from the melting vessel 1.

The holder 9 can be used to receive the stalagmitically growing semiconductor bodies. Another recommended method of operation is having the drops trickle off into a two-chamber collecting crucible 8 (FIG. 1) the two chambers being held together by means of holder 9 and clamps or brackets 10. Electrographite is a material suitable for such a collecting crucible. The advantage which such a collecting crucible presents is demonstrable by the fact that finished semiconductor bodies can be extracted undamaged and the crucible can be re-used for a number of charges.

Holder 9 is mounted on a rotatable and vertically movable shaft 14.

The entire apparatus is isolated from the outside atmosphere by a casing 11, which allows for working under a protective gas atmosphere in the presence of gaseous doping materials and under normal or low pressure. The melting vessel 1 is enclosed by a heating unit 12 and the radiation plates 13.

Semiconductor bodies manufactured according to the apparatus of the present invention find application in thermoelectrical devices. Among other uses, p- and N-doped germanium-silicon alloys find application in side pieces of thermoelements and molybdenum-silicon as bridge material.

EXAMPLE 1

Sixty g of a mixture consisting of 25 atom percent germanium, 75 atom percent silicon and 0.87 weight percent boron are placed in a melting vessel 1 consisting of a graphite crucible such as "Pyrografit" (trademark of Schunk & Ebe) and melted at $10^{-1}$ Torr. At a temperature of 1,420° C the melt is dripping dripped off. This is done by moving the piston 4 over the capillary opening 2. The said opening 2 in the bottom of the melting vessel (inside diameter 1–1.5 mm.) is enclosed in a boron nitride ring or collar 3 (inside diameter 2–2.5 mm., 2 mm. thick). A two-chamber collecting vessel or crucible 8 made of electrographite (inside diameter 12.3 mm., wall thickness 2 mm.) is mounted beneath the capillary opening 2 on the vertically movable shaft 14 rotating at a speed of 100 RPM. The drop sequence is so adjusted that the melt over the crystallization front is not fully solidified when the next consecutive drop appears. The weight of the drops is constant, i.e., 20 mg. The collecting crucible 8 is lowered at the same speed as the crystallization front progresses as a result of the operation. After the collecting crucible has cooled off, the two crucible chambers are separated by removing the clasps 10. What is obtained is a round, fissue-free and homogeneous bar or rod of the above composition. The melting vessel as well as the collecting vessel are available for further use.

EXAMPLE 2

There is a melt made up of 1.6 atom percent of molybdenum and 98.4 atom percent of silicon, and 0.62 weight percent of boron in the melting vessel 1 made of graphite coated with the "Pyrografit" mentioned above. The melt is heated to 1,480° C in the vessel 1 filled with argon, and then dripped off through the capillary opening 2. The inside diameter of said opening is 1.8 mm. Same is surrounded by a ring or collar 3 of boron nitride having an inside diameter of 2.5 mm. The drop weight is 30 mg. Beneath the opening 2 there is a collecting crucible made of graphite (10 × 13 mm.). The drop speed and the crucible lowering speed are adjusted as per Example 1. The collecting crucible is here rotated at a speed of 500 RPM. After the crucible has cooled, the obtained product is a fissure-free rectangular bar of the above composition. The melting vessel as well as the collecting crucible can be re-used.

The invention claimed is:

1. Apparatus for manufacturing semiconductor bodies from a substance selected from the group consisting of germanium-silicon and molybdenum-silicon, comprising a melting vessel having an outlet portion defining a capillary opening in the bottom and composed of a material selected from the group consisting of pyrolytic graphite, electrographite and silicon carbide, a collar on the outside of said vessel surrounding the lower end of said outlet portion, said collar being composed of a material selected from the group consisting of boron nitride and silicon nitride and having an inside diameter exactly the same as the outside diameter of said outlet portion and only slightly larger than the diameter of said capillary opening, a piston in said vessel movable up and down above said capillary opening to press drops of molten substance in said vessel out through said capillary opening, and a vertically movable receiver for said drops of molten substance beneath said capillary opening.

2. Apparatus according to claim 1, having an enlarged opening above said capillary opening, in which enlarged opening the lower end of said movable piston makes a close fit.

3. Apparatus according to claim 1, in which the smallest distance of the descending piston from said capillary opening in said vessel is 0.1 to 10 mm.

4. Apparatus according to claim 1, in which said capillary opening is from 1–1.8 mm. in diameter and the inside diameter of said collar is from 2–2.5 mm.

* * * * *